Patented Aug. 20, 1929.

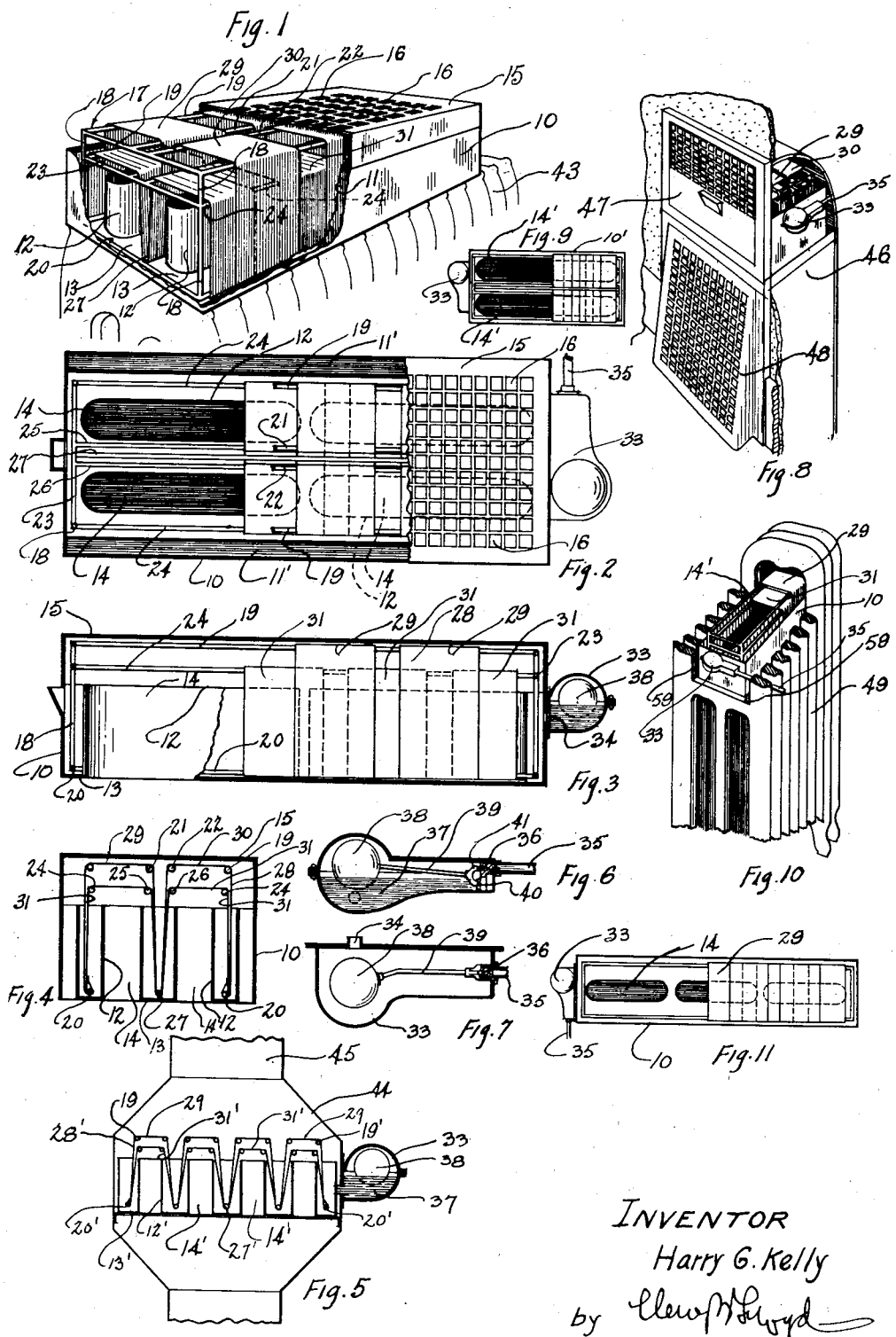

1,725,005

UNITED STATES PATENT OFFICE.

HARRY G. KELLY, OF OMAHA, NEBRASKA.

HUMIDIFIER.

Application filed April 30, 1927. Serial No. 187,765.

This invention relates to humidifiers and more particularly to means for humidifying heated air, although it may be employed with equal advantage for other purposes.

It contemplates more especially the provision of a constant moisture film in the path of heated air to effect the humidification thereof.

Air under normal atmospheric conditions is ordinarily humid and contains sufficient moisture recognized to be conducive to healthful conditions. On the other hand, artificially heated air is substantially devoid of the requisite moisture, and as a consequence thereof is instrumental in affecting the health of individuals exposed thereto.

Numerous types of humidifiers have heretofore been proposed, but these are not altogether desirable in that they require much attention and materially reduce the thermal effect of the heat transmitting medium.

Further, they are productive of moisture concentrated vapors which create a fog on the confines of a room wherein they are situated and especially on the windows thereof; however the greatest possible benefit is derived from a uniform distribution of moisture in the heat transmitting medium usually consisting of air, such a distribution not being obtainable with known humidifiers of inexpensive design.

One object of the present invention is to improve the operation and simplify the construction of devices of the character mentioned.

Another object is to provide a constant moisture film in the path of the heat transmission medium.

Still another object is to provide means for automatically sustaining a predetermined quantity of moisture in the path of the heat carrying medium.

A further object is the provision of a moisture absorbent in communication with a water reservoir to continuously maintain a moisture film in the path of an air supply.

A still further object is the provision of superposed layers of absorptive material in communication with a water supply to effect the constant saturation thereof in the path of an air draft which is thereby rendered humid.

Still a further object is the provision of an automatically controlled water source in communication with a moisture absorbent capable of being continuously saturated thereby to humidify air impinging thereagainst.

Other objects and advantages will appear from the following description of an illustrated embodiment of the present invention.

In the drawings:

Figure 1 is a perspective view of a device embodying features of the present invention, external parts being removed to clarify the internal structure thereof;

Figure 2 is a plan view of the device shown in Figure 1, a portion of the cover thereof being removed to clarify the showing;

Figure 3 is a view in elevation with the side wall thereof removed to show the parts contained therein;

Figure 4 is a sectional view taken substantially along line IV—IV of Figure 2;

Figure 5 is a sectional view of a humidifier embodying features of the present invention, associated with an air passage constituting a confining medium therefor;

Figure 6 is a sectional view of a water regulating device employed in connection with the humidifier illustrated in Figure 1, the regulator being shown in operative position responsive to the admission of a maximum quantity of water;

Figure 7 is an interior plan view of the device shown in Figure 6;

Figure 8 is a perspective view of a humidifier used in conjunction with a hot air source prior to its discharge through proper registers;

Figure 9 is a plan view of the device shown operatively positioned in Figure 8;

Figure 10 is a perspective view of a humidifier employed in conjunction with a radiator of substantially standard construction; and Figure 11 is a plan view of the device shown operatively positioned in Figure 10.

The structure selected for illustration is capable of association with various heat sources which expel heated air therefrom usually devoid of the proper humidity consistent with healthful conditions.

The structure illustrated in Figure 1 comprises a substantially rectangular frame or casing 10 within which is disposed a correspondingly shaped chamber 11 capable of confining a liquid such as water therein. The chamber 11 is somewhat narrower than the casing 10 in that the sides thereof are spaced from each other to form air passages 11' therebetween, the interior of the chamber 11 being in this instance provided with elongated parallel spaced, vertically extending collars 12 refining tubular passages 14 through which air is conducted. As shown, the tubular passages 14 defined by the collars 12 communicate with correspondingly shaped apertures provided in the bottom of the chamber 11, the casing 10 being devoid of a bottom which enables the ready removal thereof independent of the liquid chamber 11. With this arrangement, the cover 15 thereof which is perforated to define any suitable apertures 16 therein, may be associated with the casing 10 to constitute an integral part thereof.

Means are provided to support a moisture film in the path of the passages 14 to humidify the air passing therethrough. The supporting means consists, in this instance, of a skeleton frame or rack 17 composed of a plurality of parallel spaced and normally related rods arranged to define vertically disposed corner members 18 interconnected by horizontally disposed rods 19 superposed above correspondingly arranged rods 20 which terminate at and are secured to the corners 18. The frame or rack 17 is disposed within the water chamber 11 and entirely concealed from view by virtue of the casing 10 having a closure 15 associated therewith in any suitable manner. Spaced rods 21 and 22 are disposed parallel to each other intermediate the end rods 19 in a position between the passages 14 to co-operate with the side rods 19 to define a grid capable of supporting sheet material thereon in confronting relation with the passages 14. Another grid composed of end and side rods 23 and 24, respectively, is fixed to the corner rods 18 above the upstanding collars 12, it being somewhat narrower than the grid 19 superposed thereabove for reasons which will appear more fully hereinafter. Spaced rods 25 and 26 are fixed intermediate the end rods 23, they being arranged in a somewhat greater spaced relation (Figure 4) than the rods 21 and 22 superposed thereabove. As shown, the bottom end rods 20 are interconnected by virtue of the centrally located rod 27 disposed between the elliptical collars 12 to enable sheet material to be tensioned over the passages 14 in the path of convection currents which impinge against the underside thereof.

Any suitable means may be employed to maintain a constant moisture film in the path of the air flowing through the passages 14. The moisture sustaining means comprises, in this instance, absorbtive sheet material preferably strips of felt or bath towels 28 anchored at one extremity thereof to the side rods 20 for successive disposition in a tensioned condition about the rods 19, 21, 27, 22, 19, and 20 (Figure 4) to define horizontally disposed portions 29 and 30 which confront the air passages 14. It is to be noted that numerous strips may be disposed along the length of the rods preferably in spaced relation to permit the flow of air therebetween.

Further, to increase the surface area of the moisture film, other strips 31 of absorptive sheet material are positioned about the grid 23 in a manner similar to that described relative to the sheet material 28, the ends thereof being likewise anchored to the side rods 20 of the removable skeleton frame or rack 17. The absorbent strips 31 are preferably arranged in staggered relation with reference to the sheet material 28 so as to compel the air to pursue a tortuous path therebetween to effect the humidification thereof owing to its intimate association with the moisture film sustained by the absorbent material 28 and 31. It is to be noted that convection currents entering the casing 10 pursue independent paths, in that a flow is created through the passages 11' and 14 which direct the air against the absorbents on either side thereof. The absorbent material is maintained saturated with moisture in that the end and intermediate portions thereof are immersed in the liquid contained in the chamber 11, the level of the liquid therein being held constant owing to an automatic control to be hereinafter described.

The liquid control consists of an auxiliary tank 33 which is detachably associated with the casing 10 in any suitable manner to communicate therewith through a port 34 provided in the adjacent walls thereof. Water is conducted through a conduit 35 from any suitable supply source, the tank 33 having a valve 36 therein rendered automatically responsive to the level of the liquid 37 confined therein. The automatic control means consists of a spheroidal float 38 fixed to an arm 39 pivotally associated with the wall of the reservoir 33 as at 40. The reciprocal valve 36 is operatively connected to a lug 41 fixed to the arm 39 for movement therewith responsive to the pivotal movement of the arm 39 occasioned by the level of the liquid contained in the reservoir 33. Thus the level of the liquid contained in the chamber 11 will be maintained constant at all times irrespective of the degree of evaporation effected by the humidification of the air which pursues a tortuous path about the moisture films, in this instance contained in the sheet absorptive material 28 and 31.

It is obvious that any number of passages 14 may be employed by merely varying the number of shoulders 12 arranged within the liquid container 11, since the manner of suspending the absorptive material therein is also capable of variation to meet specific conditions and the dictates of technical practice.

The various embodiments disclosed herein are substantially similar in so far as the principle of operation is concerned, yet their construction has been varied to enable their use in association with numerous heat supplying devices. In Figure 1 the entire casing 10 is placed upon a radiator 43 of standard construction, in that the air heated between the segments thereof will pass upwardly through the passages 14 defined by its respective annulus 12 and passages 11'.

A modified structure illustrated in Figure 5 comprises a chamber 44 constituting an enlarged portion in a heat conveying passage 45 which communicates with any suitable source of heat, the humidifier being disposed within the enlargement 44 so that the air passing therein will be conducted through the passages 14' in association with the sheet material 28' and 31' carrying a moisture film therein.

Figure 8 discloses another modified embodiment, the humidifier being associated with the discharge orifice of a branched heat conducting pipe 46 having a register 47 of standard construction concealing it from view. With this arrangement, the air flowing through the branch 46 is humidified just prior to its passage through the register 47 which communicates with a room capable of being heated thereby. Air discharged through the register 48 is unaffected by the humidifier in that this branch of the conduit is supplied with air directly from the heat source.

The modified embodiment illustrated in Figure 10 consists of a radiator 49 of standard construction which is provided with a transverse passage 50 to receive the humidifier therein, the passage 14' of the humidifier communicating with the passages defined by the spaced segments constituting the lower part of the radiator 49.

It will thus be apparent that a novel humidifier has been provided, which is capable of sustaining a moisture film in the path of heated air prior to its discharge into a confining medium such as a room to uniformly render the air humid therein.

Various changes may be made in the embodiment of the invention herein specifically described without departing from or sacrificing any of the advantages of the invention as defined in the appending claims.

I claim:

1. The combination with an air passage, of means for dividing the flow therethrough, moisture sustaining means in the paths of said divided flow, and a water supply in communication with said moisture sustaining means, said moisture sustaining means comprising superposed alternately disposed strips of absorptive material arranged in spaced relation.

2. The combination with a casing, of a liquid chamber therein, a plurality of parallel rods disposed in said casing above said liquid chamber, absorptive material supported by said rods, means in said liquid chamber to anchor said absorptive material in communication with the liquid contained therein, other rods disposed above said parallel rods, and absorptive material supported thereby in superposed relation with said other material to interfere with the normal flow of air through said casing.

3. The combination with a casing, of a liquid chamber therein, a plurality of parallel rods disposed in said casing above said liquid chamber, absorptive material supported by said rods, means in said liquid chamber to anchor said absorptive material in communication with the liquid contained therein, other rods disposed above said parallel rods, and absorptive material supported thereby in superposed relation with said other material to interfere with the normal flow of air through said casing, said rods and anchoring means being arranged in staggered relation.

4. The combination with a water chamber, a tubular member disposed therein defining an air duct therethrough, a rack disposed within said chamber, absorbent material tensioned about said rack to confront said duct, said material having portions thereof constantly immersed in the water contained in said chamber and a casing enclosing said chamber to direct convection currents against the surfaces of said absorbent material, there being apertures in said casing to release the humidified currents therethrough.

5. The combination with a water chamber, a tubular member disposed therein defining an air duct therethrough, a rack disposed within said chamber, absorbent material tensioned about said rack to confront said duct, said material having portions thereof constantly immersed in the water contained in said chamber, and a casing enclosing said chamber to direct convection currents against the surfaces of said absorbent material, there being apertures in said casing to release the humidified currents therethrough, said enclosing casing having walls thereof confronting corresponding walls of said chamber to define passages to direct air against the top surfaces of said material.

6. The combination with a water chamber, a tubular member disposed therein defining an air duct therethrough, a removable rack disposed within said chamber, a plurality of spaced absorbent strips tensioned about said rack to confront said duct, said strips having portions thereof constantly immersed in the water contained in said chamber, and a casing enclosing said chamber to direct convection currents against the outer surfaces of said strips, there being apertures in said casing to release the humidified currents therethrough.

7. The combination with a water chamber, a tubular member disposed therein defining an air duct therethrough, a removable rack disposed within said chamber, a plurality of spaced absorbent strips tensioned about said rack to confront said duct, said strips having portions thereof constantly immersed in the water contained in said chamber, and a casing enclosing said chamber to direct convection currents against the outer surfaces of said strips, there being apertures in said casing to release the humidified currents therethrough, said absorbent strips being arranged in alternate superposed relation to provide a tortuous path for the air currents in contact with the moisture films sustained thereby.

HARRY G. KELLY.